| United States Patent [19] | [11] 4,036,271 |
|---|---|
| Presti | [45] July 19, 1977 |

[54] SEAMLESS RETREAD ENVELOPE

[76] Inventor: Fredrick Joseph Presti, 164 Shady Brook Circle, Warrington, Pa. 18976

[21] Appl. No.: 612,187

[22] Filed: Sept. 10, 1975

[51] Int. Cl.² ............................................ B29H 17/36
[52] U.S. Cl. ................................... 150/54 B; 156/96; 156/394; 264/326
[58] Field of Search ............................. 156/96, 126–129, 156/394 R, 394 FM, 416, 125; 264/299, 326; 150/54 B

[56] References Cited

U.S. PATENT DOCUMENTS

| | | | |
|---|---|---|---|
| 2,497,226 | 2/1950 | McNeill | 156/125 |
| 2,615,203 | 10/1952 | DuPree | 264/326 |
| 2,976,910 | 3/1961 | Nowak | 156/96 |
| 3,236,709 | 2/1966 | Carver | 156/96 |
| 3,745,084 | 7/1973 | Schelkmann | 156/96 |
| 3,752,726 | 8/1973 | Barefoot | 156/96 |
| 3,846,201 | 11/1974 | Huskins | 156/96 |
| 3,849,220 | 11/1974 | Suzuki et al. | 156/125 |
| 3,884,739 | 5/1975 | Hindin et al. | 156/96 |
| 3,909,337 | 9/1975 | Yabe | 156/394 |

FOREIGN PATENT DOCUMENTS

| 746,375 | 3/1956 | United Kingdom | 156/96 |
|---|---|---|---|

*Primary Examiner*—Charles E. Van Horn
*Assistant Examiner*—John E. Kittle
*Attorney, Agent, or Firm*—Benasutti Associates, Ltd.

[57] ABSTRACT

A retread envelope press, seamless retread envelope, and method for manufacturing said seamless retread envelope are described as facilitating the production of superior retreaded or recapped tires. In particular, a seamless elastomeric compression-formed envelope is described which is formed and cured in a configuration having a U-shaped radial cross section. The envelope of the present invention also has a rip-resistant bead disposed along its peripheral edges. In manufacturing the envelope, an uncured chloro-butyl rubber slug of appropriate volume is placed in an annular compression chamber defined between two platens. As the platens are moved from a first feed position to a second forming position, the volume of the compression chamber is reduced and the elastomeric slug material is forced around a radially symmetrical core. When the platens reach the forming position, the radially symmetrical core and the platens define therebetween a molding void which is then completely filled with uncured elastomeric material. Compressive forces on the order of from 300 to 600 tons are employed, not only during the above described forming process, but also during a subsequent curing process during which the envelope is heated to a temperature of between 250° and 365° F., said heating being accomplished by introducing steam into a void defined within said core. A seamless retread envelope is produced by this process which is durable and which enables the production of a superior quality retread.

1 Claim, 5 Drawing Figures

4,036,271

SEAMLESS RETREAD ENVELOPE

BACKGROUND OF THE INVENTION

The present invention relates generally to the field of tire recapping, and more particularly, to the area of producing recapped tires using pre-cured tread sections.

Typically, tires have been recapped or retreaded by grinding down worn tires to their casings and then by replacing the lost tread using one of several different processes. One such process aligns the casing within a mold having inscribed on the interior surfaces thereof an appropriate tread design. Encased within this mold around the old tire casing is a mass of uncured material which is then heated to a cured state within the particular tire mold adapted for this purpose. Although this process has performed adequately in the past, it has suffered from the drawback that each tire size and tread design has required separate molds, typically costing thousands of dollars each.

More recently, a process has been used to recap or retread tires in which pre-cured tread of any given design is cemented to the prepared tire casing. This process is accomplished as follows: First, the tire casing to be processed is prepared by grinding or buffing off any old tread remaining on the casing. Cement is then applied and a layer of uncured cushion stock is applied to the cemented casing. An additional layer of cement is applied over the uncured cushion stock and a pre-cured tread layer is then applied over the cemented cushion stock. Finally, the entire composite uncured retread is inserted into a protective covering or envelope for encasing the exterior surfaces of the uncured retread during the curing of that retread. The purpose of this protective cover is to prevent air and/or steam used during the curing process from coming into contact with the cement and uncured cushion stock during the curing process. A further purpose of the protective cover is to compress the various components described above into tight engagement with the casing so that a suitable product is produced during curing. Typically, after the protective cover or envelope is placed around the composite uncured retread, the encased retread is then put into a curing oven at a temperature of 250° to 325° F. in an atmospheric pressure of 50 to 150 pounds per square inch. Following the curing process, the encased retread is removed from the curing oven and the protective cover is removed to produce the finished retread.

Typically, several types of retread covers have been used satisfactorily in the above described process. One such prior art product used in this process has been constructed from elastomeric calendar sheet. Two sheets of the material to be utilized in constructing this cover are cut in identically sized rings and then seamed together around the outer edges in order to produce a tire cover of the desired shape. Since the sheet goods are necessarily seamed together prior to the curing of the sheet stock, certain problems have arisen in producing a reliable seam along the outer edges thereof while preventing the more interior portions of the calendar sheets from adhering to their adjacent layer. It should be noted that the curing process which is referred to in relation to the protective tire cover or envelope is not the same curing process which is referred to in producing a cure between the pre-cured tread, cement, cushion stock and tire casing during the retreading process, but rather is the curing process which is necessary to cure the calendar sheet itself and to produce the cured seam between layers of the sheeting prior to using the protective cover or envelope in the retread manufacturing process.

Basically, there have been several approaches to satisfactorily curing the calendar sheet to produce a good, even radial seam around the outer edge while preventing the inner portions of the layers from adhering to each other. One method utilizes a dry lubricant powder which is introduced between the portions which are not to be joined while maintaining the seaming surfaces free from that powder so that they may be joined during the curing process. The cover is then cured in a flat configuration. This particular approach has the drawback of producing weak seams when powder is inadvertently introduced between the seaming surfaces. Irregular covers are produced in those instances where the inner portions of the sheeting are inadequately coated with the lubricant powder and therefore the layers adhere to each other during the curing process. It is very difficult to produce a strong, precise circular seam around the outermost edge of the calendar goods to be joined. Finally, cold checking results and air blisters further reduce the durability of the completed product.

In order to overcome some of the disadvantages of the calendar sheet covers, an alternate process has been developed wherein a butt seamed tube, very similar to a tire tube, is slit along its innermost radical periphery and is then used in the manner described above. This particular type of cover, however, has the drawback that it too not properly conform to the outer surfaces of a composite uncured retread, nor does the substitution of a tubular design substantially increase the efficiency of the retreading process over that heretofore obtained by the calendar sheet covers. Furthermore, by reason of the method of manufacture of both the calendar sheet and tubular covers, there can be no variation in the thickness of the covers, nor is any tear resistance imparted to the cover during the manufacturing and/or curing process. To the contrary, the slitting of a tube in the manner described above tends to result in the nicking of surfaces of the tube which then, during the utilization of the tube cover in the curing process, results in the tearing of that cover after relatively few uses thereof. Similarly, each of these covers has a tendency to slit along the seam and deterioration of the covers described herein usually limits their usage to between one and ten retread curings.

SUMMARY OF THE INVENTION

The present invention provides a seamless retread envelope which is compression-formed and compression-cured, and which overcomes many of the above described disadvantages of prior art retread covers. In particular, the present invention employs a process wherein an uncured elastomeric slug is compression-formed around a radially symmetrical core to produce a seamless envelope of a thickness and shape particularly adapted to the retread process. After forming, the seamless envelope of the present invention is then cured under compression in exactly the shape in which the envelope is to be used, thereby imparting a ruggedness and dependability to the envelope heretofore unobtainable in the prior art. The seamless compression-formed envelope of the present invention is expected to give a more uniform performance and greater number of cures. This durability is accomplished not only by means of the novel forming and curing processes employed in its manufacture, but also by reason of the fact that certain precautions are taken against the tearing of the envelope, firstly by eliminating any seams along which that tearing could occur, and secondly, by providing areas of increased thickness along the peripheral edges thereof which during normal use are subjected to conditions which cause tearing of the envelope materials.

The novel seamless compression-formed retread envelope of the present invention is formed into the desired U-shaped radial cross section by utilizing a novel press having a radially symmetrical core and platens means for compressing an uncured elastomeric slug around that core. In particular, the uncured slug is introduced into a compression chamber, the volume of which is reduced as the platens, disposed axially on either side of the core, move from the feed to the forming positions. Consequently, since the compression chamber is in fluid communication with a molding void defined between the platen and core when the platens are in the forming position, the elastomeric material of this slug is compression-formed around the radially symmetrical core in order to form the seamless envelope of the present invention. In particular, this forming process is accomplished under a compressive force of from 300 to 600 tons. This compression is maintained during the subsequent curing process, wherein the material is raised to a temperature of between 250° and 365° F. by introducing steam into a void defined within said core. As a result of the above described forming and curing process, cold checks and/or air blisters which normally are present in prior art retread covers, are virtually absent in the seamless envelope of the present invention, thereby further adding to the performance characteristics and durability of the present seamless retread envelope.

Accordingly, the primary object of the present invention is the provision of a seamless retread envelope. A further object of the present invention is the provision of a retread envelope which is compression cured in its intended final configuration. A further aim of the present invention is the provision of a novel press for forming and curing a seamless retread envelope. These and other objects of the present invention will become apparent from the following discussion.

DETAILED DESCRIPTION OF THE DRAWINGS

Figure 1:
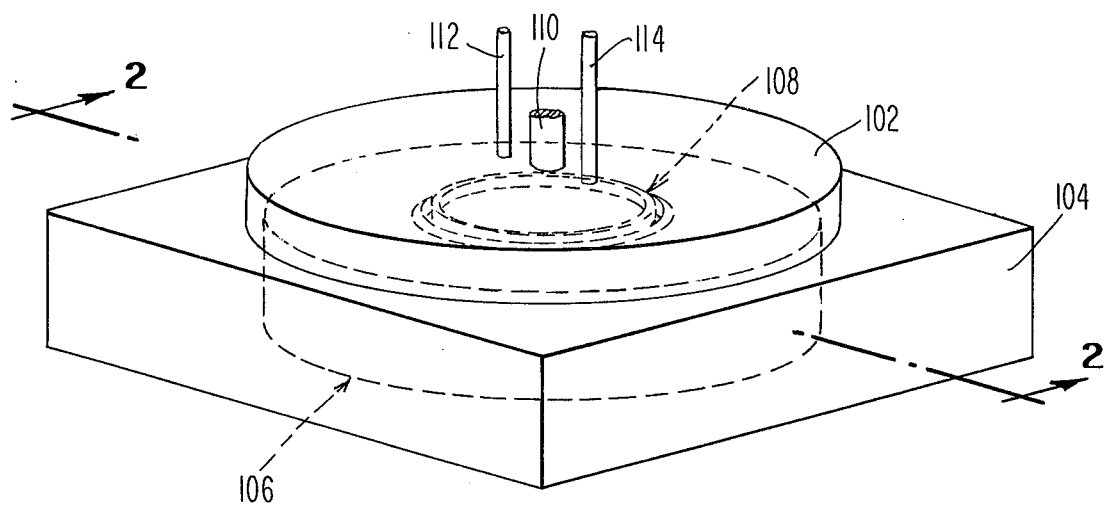
FIG. 1 is a perspective view of a press in accordance with the present invention, the core and hub of which press are shown in dotted outline therewithin.

Although specific forms of the invention have been selected for illustration in the drawings, and the following description is drawn in specific terms for the pruopose of describing these forms of the invention, this description is not intended to limit the scope of the invention which is defined in the appended claims.

Referring now to FIG. 1, the novel press of the present invention is shown, comprised of an upper platen 102, a lower platen 104, a radially symmetrical core designated generally 106 shown in dotted outline in FIG. 1, and a center hub designated generally 108 shown in dotted outline disposed within said core and supported by supporting axle 110 and in communication with steam conduit 112 and water return 114. Not shown in the figures is the means for applying compressive force to the upper and lower platens 102 and 104 respectively, nor are the support means connected to the supporting axle 110 shown in detail, since it is believed that these means are well within the purview of one of ordinary skill in the art.

Figure 2:
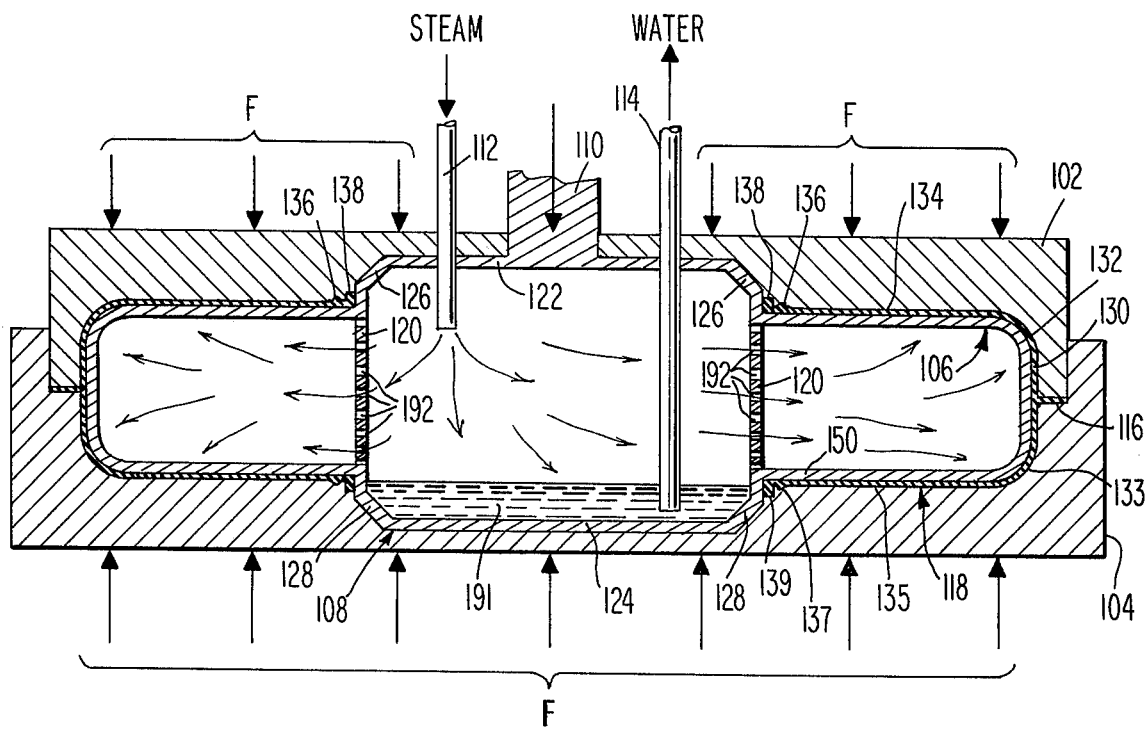
FIG. 2 is an enlarged cross section of the press shown in FIG. 1, taken as indicated by the lines and arrows 2—2 in FIG. 1, wherein the novel seamless retread envelope of the present invention is shown being cured under pressure within said press.

Referring now to FIG. 2, which is a cross section of the press shown in FIG. 1, the upper and lower platens 102 and 104 are in the forming position with respect to the hub designated generally 108 and the core designated generally 106. In this position, the compression chamber 116 (shown partially filled in FIG. 3) is of a minimum volume and is entirely filled with elastomeric material designated generally 118, as shown in FIG. 2. Both the hub designated generally 108 and the core designated generally 106 are radially symmetrical with reference to a center axis which is co-linear with the axis of the supporting axle 110. The hub designated generally 108 is comprised of cylindrical walls 120, top and bottom walls 122 and 124 respectively, and upper and lower registry bevels 126 and 128 respectively. As shown in FIG. 2, upper and lower platens 102 and 104 are complementally configured to the registry bevels and upper and lower walls of the hub so that, in the forming position as shown in FIG. 2, the upper and lower platens mate and engage the hub designated generally 108 on its end surfaces. This mating of the upper and lower platens with the hub acts to transversely align the platens with respect to the core designated generally 106, and to limit the axial movement of the upper and lower platens 102 and 104 towards each other. As shown in FIG. 2, a molding void is thereby created between the upper and lower platens 102 and 104 and the core 106. This molding void is shown in FIG. 2 entirely filled by the elastomeric material designated generally 118, which is seen to extend from the compression chamber 116 along the base portion 130 of the retread envelope, which base portion is substantially disposed in a cylindrical surface with reference to the axis of symmetry, and is seen to further extend through curved portions 132 and 133 to upper and lower side wall portions 134 and 135 respectively, which are disposed within substantially parallel planes which are generally perpendicular to the axis of radial symmetry. Circular beads 136 and 137 are shown in the elastomeric material designated generally 118, beyond which and spaced adjacent to the inner section of the hub designated generally 108 with the core designated generally 106 are the upper and lower removable flash portions 138 and 139 respectively.

Figure 3:
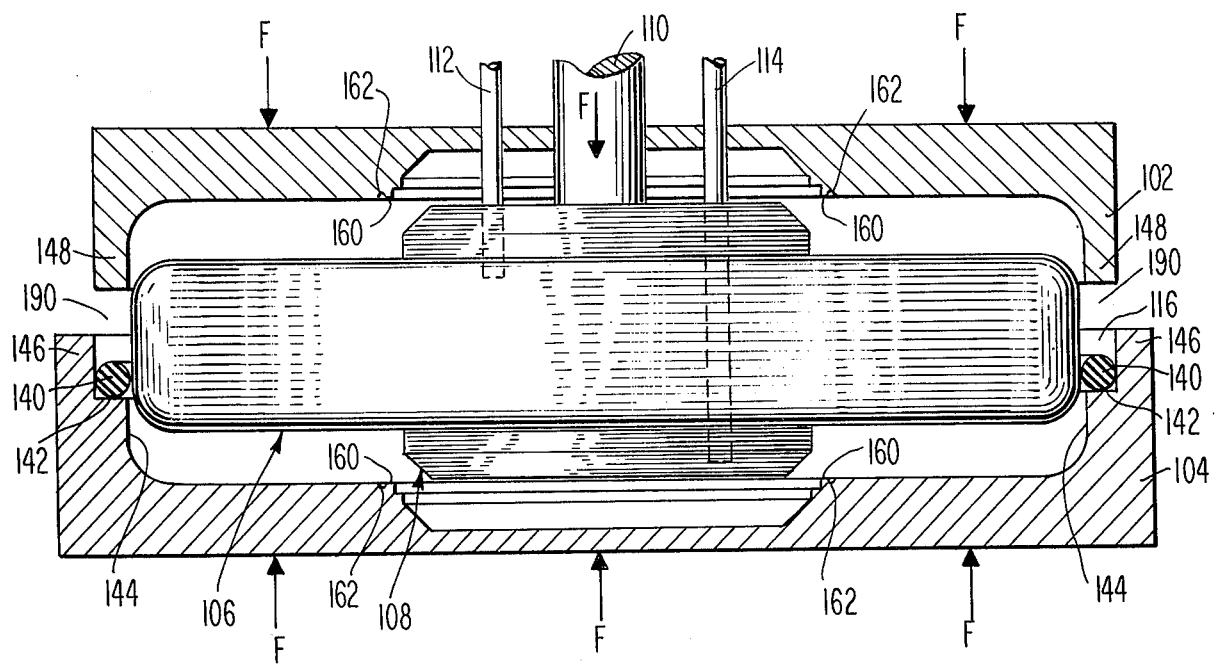
FIG. 3 is an enlarged partial cross section view of the press shown in FIG. 2 wherein the platens are shown in their feed positions and wherein a cylindrical elastomeric slug is shown disposed within the compression chamber.

Referring now to FIG. 3, the upper and lower platens are shown disposed in the feed position with respect to each other and with respect to the hub designated generally 108 and the core designated generally 106. In this position, an elastomeric slug 140 is easily introduced onto a ledge 142 defined by the lower platen 104. The annular ledge surface 142 is contiguous to the molding surface 144 of the lower platen 104, and an upwardly extending annular portion of the lower platen may be seen in FIG. 3 to form a side wall portion 146 which is adapted to form a cylindrical void therewithin and which defines the outer wall of the compression chamber 116. The upper platen 102 has extending therefrom a piston portion 148, the outer surface of which is adapted to slidingly engage the cylindrical surface formed within the side wall portion 146 of the lower platen 104 so that a compression chamber is formed between said upper and lower platens as the plattens are moved from the feed to the forming position. The elastomeric slug 140 may be composed of chloro-butyl rubber which is extruded for a normal truck tire retread envelope in a diameter of approximately 1½.

The operation of the press in producing a seamless compression-formed retread envelope can be best explained as follows: First, the platens 102 and 104 are moved to the feed position, wherein it can be seen in FIG. 3 that the core, designated generally 106, is spaced apart from each of said platens by a distance which is substantially greater than the desired thickness of the finished retread envelope. Once an elastomeric slug 140 of suitable volume is introduced onto the annular shelf 142 of the compression chamber 116 through annular opening 190, the press may be activated to apply a compressive force to the upper and lower platens in accordance with the arrows designated "F" shown in FIG. 3. As the upper and lower platens move towards each other, the volume of the compression chamber formed therebetween lessens and the elastomeric slug is forced out of the compression chamber 116 and around the core designated generally 106. Although not necessary for the process, the application of heat to the core designated generally 106 will hasten the flow of the elastomeric slug 140 and will thereby increase both the speed and continuity of flow of that material around the core designated 106.

Figure 5:
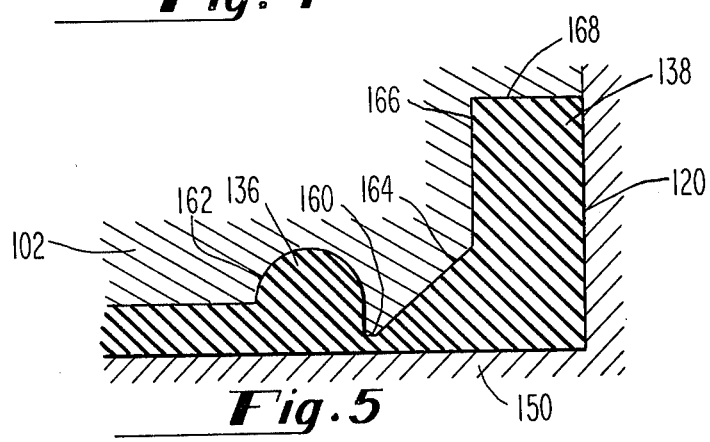
FIG. 5 is a magnified portion of the envelope shown in FIG. 4 taken as indicated by the circle and arrow 5, showing a portion of the side wall and the bead of the envelope, and indicating the position of the removable flash portion in phantom.

Referring now to FIG. 2, when compressive forces in the other of 300 to 600 tons are applied to the upper and lower platens, it will be seen that the elastomeric material designated generally 118 will conform to the molding void defined between the upper and lower platens and the core designated generally 106. Near the peripheral edges thereof, the beads 136 and 137 and the removable flash portions 138 and 139 will be formed having a cross sectional configuration as illustrated in FIG. 5. The lower wall 150 of the core designated generally 106 intersects the cylindrical wall 120 of the hub designated generally 108 near the portion of the molding void which forms the bead 136 and removable flash portion 138. The bead 136 and removable flash portion 138 are formed as the elastomeric material designated generally 118 flows toward the cylindrical wall 120 of the hub during the forming process. The thickness of the molding void is seen to be constricted by an annular edge 160, which is disposed adjacent to a concave recess 162 formed in the platen. The annular edge 160 forming the constriction tends to shunt the elastomeric material into the concave recess 162 to form an integral bead 136, while at the same time allowing excess material to flow past the edge 160 and into a void defined by a beveled surface 164 of the platen, a cylindrical surface 166 of the platen and an annular surface 168 of the platen, which surfaces, together with the opposing portions of the cylindrical wall 120 of the hub and lower wall 150 of the core, define the removable flash portion of the molding void.

After the envelope of the present invention is formed, the compressive forces in the order of 300 to 600 (preferably 500) tons, is maintained on the envelope during the curing processes represented in FIG. 2. During this process, steam from a steam source, not shown in the drawings, is introduced through steam conduit 112 disposed through the upper portion of the upper conduit 102 into the recess defined by the hub designated generally 108. Perforations 192 in the cylindrical wall 120 of the hub allow the steam to pass into the void defined by the core designated generally 106 and to condense on the interior surfaces of said core designated generally 106, thereby liberating substantial amounts of heat which are transferred through the steel or other metal used to construct the core to the elastomeric material to be cured. This steam is preferably superheated to a temperature of between 250° and 375° F., and more preferably, to a temperature of approximately 320° F. Condensed water 191 returns to the bottom of the hub designated generally 108, again by perforations 192 in the cylindrical wall 120 from whence it is removed by water return 114 for recycling in the form of steam. This heating process is continued until the elastomeric material designated generally 118 is entirely cured, at which time the upper and lower platens 102 and 104 are returned to the feed position and the seamless compression-formed and cured elastomeric retread envelope of the present invention is manually removed from the core designated generally 106.

Figure 4:
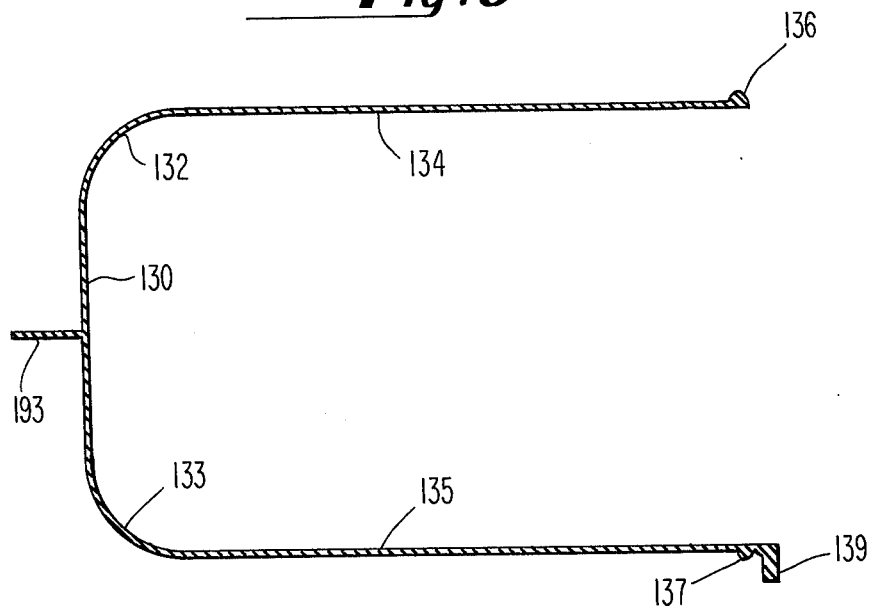
FIG. 4 is a radial cross section of the seamless retread envelope of the present invention wherein one of the peripheral edges of that envelope is shown still attached to the removable flash portion created during forming.

Referring now to FIG. 4, a finished seamless elastomeric envelope designated generally 170 is shown in radial cross section having beads 136 and 137 disposed along the peripheral edges thereof. Upper removable flash portion 138 has already been removed from the envelope shown in FIG. 4, however, lower removable flash portion 139 is shown still attached to the lower peripheral edge of the envelope. Lower removable flash portion 139 may be quickly and easily removed from the lower peripheral edge by scoring the portion of the envelope disposed between the flash portion 139 and the bead 137, and by simply tearing the flash portion away from the remainder of the envelope. Due to the increased thickness of the envelope at the bead, there is little or no danger of tearing or otherwise damaging the finished envelope. Typically, the side walls 134 and 135 of the envelope, the base wall 130 and the curved portions 132 and 133 will be of uniform thickness. Applicant has found that for a standard truck tire retread, a thickness of 0.080 inches ± 0.010 inches is easily obtainable, and that such an envelope (having, for example, dimensions on the order of 7½ from upper to lower surface and having a diameter of 41) is entirely suitable for use in curing a variety of similarly sized truck tire retreads having any of a number of different tread designs.

Also seen in FIG. 4 is the flash portion 193 which is integrally connected to the base portion 130 of the envelope. This flash portion 193 represents the remainder of the elastomeric slug 140, which is retained within the compression chamber 116 as the platens 102 and 104 move to the forming position. In normal use, this flash portion 193 does not interfere with the retreading process, and in fact, is useful not only in handling the seamless retread envelope of the present invention, but is also useful in aligning the envelope with respect to the composite retread prior to the retread curing process.

It will be understood that various changes in the details, materials and arrangement of parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a non-legal technical statement of the contents of the disclosure in compliance with the Rules of Practice of the United States Patent Office, and is not intended to limit the scope of the invention described and claimed herein.

What is claimed is:

1. An article of manufacture for encasing the exterior surfaces of a tire having a cured tread adhered thereto by an uncured bonding layer during the curing of said tire, to form a retreaded tire, said article comprising a seamless compression-formed envelope for encasing the tread, bonding layer and side walls of said tire to thereby retain said tread against said tire and to prevent air from contacting said bonding layer, during said curing process, said envelope being compression molded to comprise two parallel, co-cylindrical substantially circular peripheral edges connected and spanned by a single elastomeric web extending radially outwardly from said edges, said elastomeric web having a U-shaped radial cross-section, said web comprising side wall and base wall portions, said side wall portions being generally disposed within parallel spaced apart planes and extending for a distance at least sufficient to encase at least the side walls of said tire to be encased, and said base wall portion being disposed generally within a cylindrical surface which is concentric to and of a radius which is greater than the radius of said peripheral edges by a distance at least as great as the side wall to be encased, said side wall portions portion and base wall portion being joined to each other by curved connecting portions.

* * * * *